(12) United States Patent
Birkner

(10) Patent No.: US 11,512,727 B2
(45) Date of Patent: Nov. 29, 2022

(54) CONNECTING BOLTS AND ASSOCIATED CONNECTION PROTECTION

(71) Applicant: Häfele Berlin GmbH & Co KG, Berlin (DE)

(72) Inventor: Robert Birkner, Berlin (DE)

(73) Assignee: Häfele Berlin GmbH & Co KG, Berlin (DE)

( * ) Notice: Subject to any disclaimer, the term of this patent is extended or adjusted under 35 U.S.C. 154(b) by 0 days.

(21) Appl. No.: 17/805,287

(22) Filed: Jun. 3, 2022

(65) Prior Publication Data

US 2022/0290709 A1 Sep. 15, 2022

Related U.S. Application Data

(63) Continuation of application No. PCT/EP2020/084898, filed on Dec. 7, 2020.

(30) Foreign Application Priority Data

Dec. 9, 2019 (DE) ...................... 20 2019 106 842.6

(51) Int. Cl.
  *F16B 12/24* (2006.01)
  *F16B 13/12* (2006.01)
  *F16B 13/08* (2006.01)
  *F16B 13/04* (2006.01)

(52) U.S. Cl.
  CPC ............ *F16B 13/126* (2013.01); *F16B 12/24* (2013.01); *F16B 13/0816* (2013.01); *F16B 13/04* (2013.01)

(58) Field of Classification Search
  CPC .......... F16B 12/24; F16B 12/20; F16B 13/04; F16B 35/06

USPC ................................................... 411/400, 21
See application file for complete search history.

(56) References Cited

U.S. PATENT DOCUMENTS

| | | | | | |
|---|---|---|---|---|---|
| 1,955,353 | A | * | 4/1934 | Wiley | ...................... F16B 35/06 411/400 |
| 2,098,997 | A | * | 11/1937 | Bramming | ................ B60S 1/34 411/401 |
| 4,779,830 | A | * | 10/1988 | Phelps | .................... A47B 57/56 211/187 |
| 5,647,711 | A | | 7/1997 | Berger | |
| 6,182,937 | B1 | * | 2/2001 | Sanderse | .............. A47B 96/061 248/242 |
| 6,371,313 | B1 | * | 4/2002 | Walter | ...................... A47F 5/10 248/220.31 |
| 7,866,492 | B2 | * | 1/2011 | Walter | ................... A47F 5/0815 211/103 |
| 8,348,210 | B1 | * | 1/2013 | Lee | ......................... A47B 57/22 248/224.7 |
| 10,844,892 | B2 | * | 11/2020 | Mätzler | .................... F16B 13/06 |
| 2017/0175789 | A1 | | 6/2017 | Mätzler | |

(Continued)

FOREIGN PATENT DOCUMENTS

| DE | 295 07 834 U1 | 7/1995 |
|---|---|---|
| DE | 198 30 740 A1 | 1/2000 |

(Continued)

*Primary Examiner* — Flemming Saether
(74) *Attorney, Agent, or Firm* — Hackler Daghighian Martino & Novak

(57) ABSTRACT

A connecting bolt has a bolt shank and a bolt head which has a radially outwardly projecting bolt projection. The bolt head has a latching projection between the bolt shank and the bolt projection on the side opposite the bolt projection.

10 Claims, 2 Drawing Sheets

(56) References Cited

U.S. PATENT DOCUMENTS

| | | |
|---|---|---|
| 2019/0269240 A1 | 9/2019 | Bobillier et al. |
| 2021/0254648 A1 | 8/2021 | Leistert et al. |

FOREIGN PATENT DOCUMENTS

| | | |
|---|---|---|
| DE | 203 12 613 U1 | 11/2003 |
| DE | 10 2010 051 372 B4 | 5/2012 |
| DE | 20 2015 008 847 U1 | 3/2017 |
| DE | 20 2018 106 278 U1 | 11/2018 |
| WO | 2018/020097 A1 | 2/2018 |

\* cited by examiner

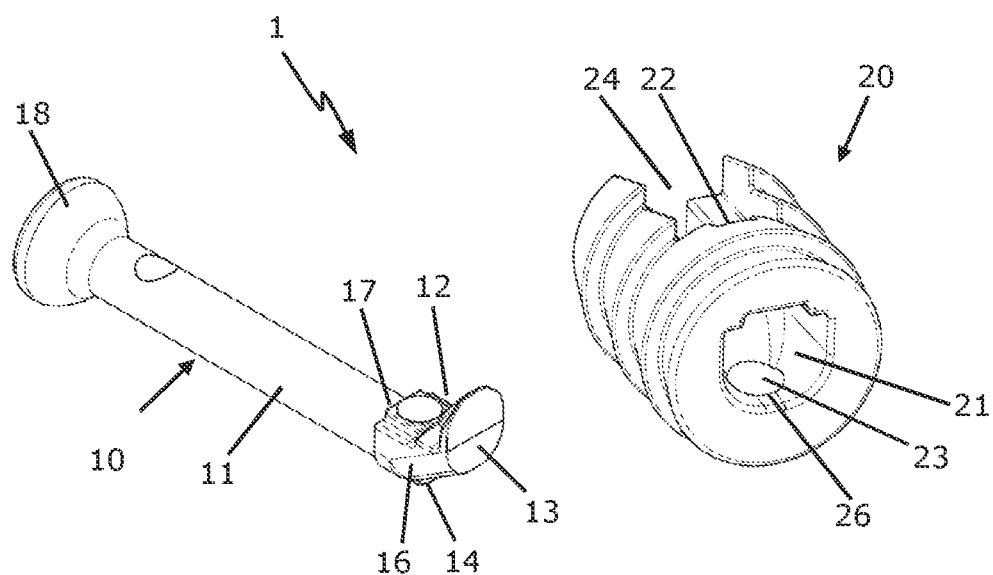
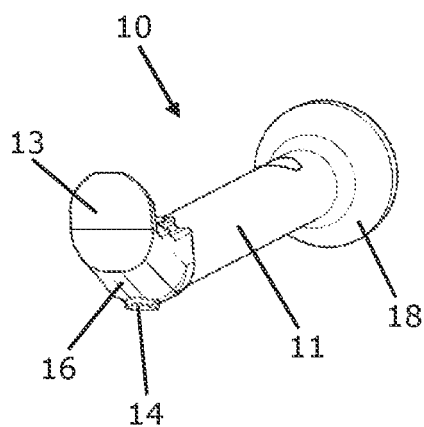
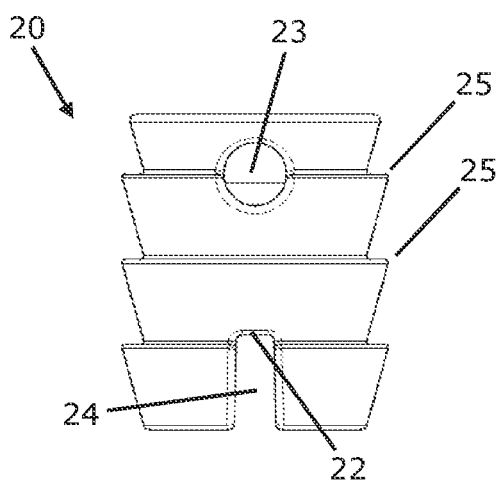
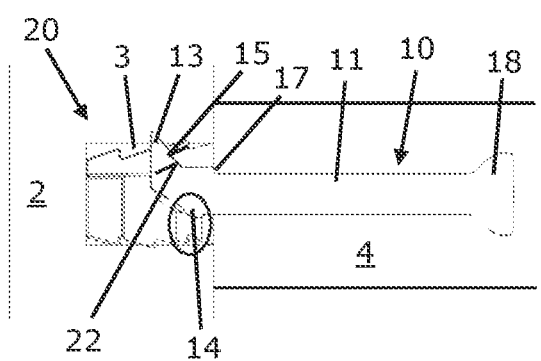
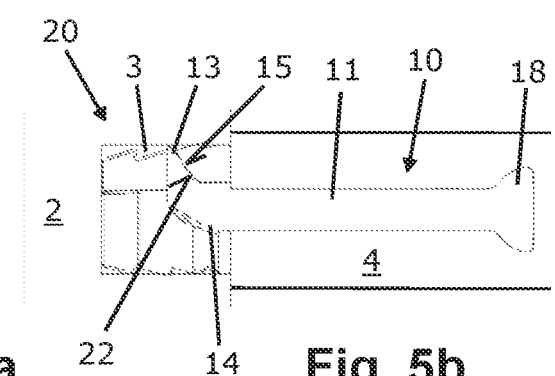
Fig. 1
Fig. 2
Fig. 3
Fig. 5a
Fig. 5b

CONNECTING BOLTS AND ASSOCIATED CONNECTION PROTECTION

CROSS-REFERENCE TO RELATED APPLICATIONS

This continuation application claims priority to PCT/EP2020/084898 filed on Dec. 7, 2020 which has published as WO 2021/116023 A1 and also the German application number 20 2019 106 842.6 filed on Dec. 9, 2019, the entire contents of which are fully incorporated herein with these references.

DESCRIPTION

Field of the Invention

The invention relates to a connecting bolt for connecting two components, in particular two furniture boards made of particle-like, MDF-like or wood-like materials, having a bolt shaft and having a bolt head which has a radially outwardly protruding bolt projection. The invention further relates to an associated connecting fitting having the connecting bolt and a socket.

Background of the Invention

DE 20 2018 106 278 U1 describes a connecting bolt which is anchored with the bolt shaft thereof in the first portion. The bolt head is then pivoted with the blade-like projection thereof into a hole of the second portion, whereby the projection penetrates into the hole wall of the second portion and the connecting bolt is anchored in the hole.

SUMMARY OF THE INVENTION

An object of the present invention is to develop a connecting bolt of the type mentioned in the introduction in such a manner that the connection effect is improved and to provide an associated connecting fitting.

The object is achieved according to the invention, on the one hand, by a connecting bolt in which the bolt head has a locking projection between the bolt shaft and bolt projection at the side opposite the bolt projection and also by a connecting fitting having such a connecting bolt and having a socket which has a socket opening and inside the socket both a socket transverse face which is directed in the direction away from the socket opening and a locking recess which is arranged between the socket opening and socket transverse face at the side opposite the socket transverse face, wherein in the assembled state of the connecting fitting the bolt head is introduced into the socket opening and both the bolt projection engages behind the socket transverse face in the introduction direction of the connecting bolt and the locking projection is engaged in the locking recess.

Other advantages of the invention will be appreciated from the description, the claims and the drawings. The features mentioned above and those set out in greater detail below can also be used individually or together in any combinations. The embodiments shown and described are not intended to be understood to be a definitive listing, but instead are of an exemplary nature to describe the invention.

BRIEF DESCRIPTION OF THE DRAWINGS

In the drawings:

FIG. 1 shows a perspective view of the connecting fitting according to the invention having a connecting bolt and having a socket;

FIG. 2 shows another perspective view of the connecting bolt;

FIG. 3 shows a side view of the socket;

FIGS. 5a, 5b show a cross section through the mounted connecting fitting which is shown in FIG. 4d and which has a narrow socket (FIG. 5a) and a wide socket (FIG. 5b).

DETAILED DESCRIPTION OF THE PREFERRED EMBODIMENTS

Figure 4A:
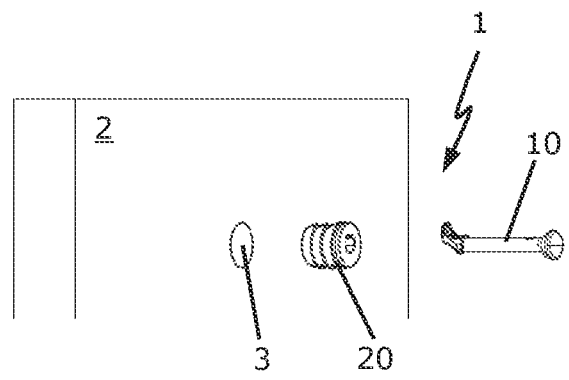
FIGS. 4a-4d show the assembly of the connecting fitting according to the invention on a furniture item wall.

The connecting fitting 1 shown in FIG. 1 serves to connect two components, in particular two furniture panels made of particle boards, MDF, wood or the like, and comprises a connecting bolt 10 made of metal and a plastics material socket 20.

The connecting bolt 10 has a cylindrical bolt shaft 11 and at the end side a bolt head 12 having a radially outwardly protruding, for example, claw-like or blade-like, bolt projection 13. As shown in FIG. 2, the bolt head 12 has between the bolt shaft 11 and bolt projection 13 at the side opposite the bolt projection 13 a locking projection 14 which is preferably constructed in a convex, in particular dome-like or hemi-spherical manner. The rear side of the bolt projection 13 facing the bolt shaft 11 is constructed as an inclined face 15 and the bolt side 16 located opposite the bolt projection 13 is chamfered. At the side of the bolt projection 13, the bolt shaft 11 merges via a radially outwardly directed step 17 into the bolt head 12. At the other end thereof, the connecting bolt 10 also has a bolt head 18 which is hemi-spherical in this instance.

The socket 20 has a front-side socket opening 21 and inside the socket 20 both a socket transverse face 22, which is directed in the direction away from the socket opening 21 and which is inclined in this instance, and a locking recess 23 which is arranged between the socket opening 21 and socket transverse face 22 at the side opposite the socket transverse face 22. The locking recess 23 may be formed by a locking indentation or, as shown in the embodiment, by a transverse opening. The socket transverse face 22 forms the wall of a lateral socket opening 24 which is open at the cover side and which, as shown, may be configured as a slot which is open at the rear side. At the outer side thereof, the socket 20 is provided with a plurality of barb-like ribs 25.

Figure 4B:
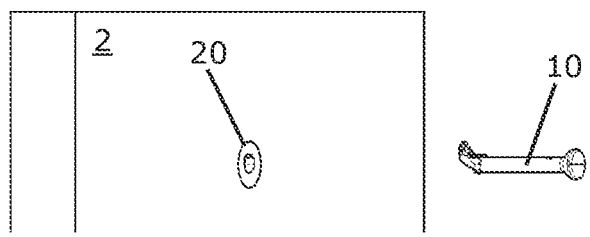
Figure 4C:
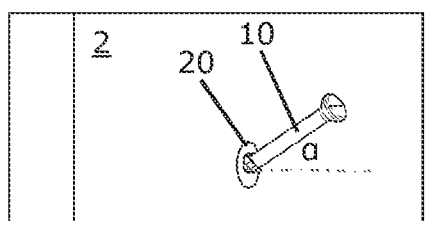
Figure 4D:
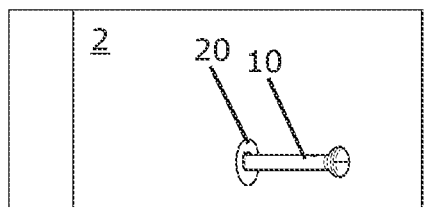

In FIGS. 4a-4d, the assembly of the connecting fitting 1 on a furniture panel 2 is shown.

Firstly, the socket 20 is pressed, with the socket opening 24 upward, into a hole 3 in the furniture panel 2 (FIGS. 4a, 4b), wherein the ribs 25 engage in the hole wall. Preferably, the socket 20 is additionally glued in the hole 3.

The bolt head 12 of the connecting bolt 10 which is tilted at an angle $\alpha$ (in this instance, purely by way of example, approximately 45°) is then introduced by the operator into the socket opening 21 without the use of tools (FIG. 4c) until the chamfered bolt side 16 rests on the opening edge 26 of the socket opening 21.

Finally, the connecting bolt 10 is pressed or tilted through the angle $\alpha$ in a downward direction into the end position thereof which is at right-angles with respect to the furniture panel 2 (FIG. 4d), whereby, on the one hand, the bolt projection 13 engages with the inclined face 15 thereof behind the inclined transverse face 22 and, on the other hand, the chamfered bolt side 16 slides on the opening edge 26 further into the socket 20. As a result of the tilting movement, the bolt head 12 is pulled further into the socket 20 until the locking projection 14 is engaged in the locking recess 23 (FIGS. 5a, 5b). The bolt shaft 11 then extends coaxially relative to the socket axis and consequently at right-angles with respect to the furniture panel 2, and the step 17 of the connecting bolt 10 terminates flush with the socket end face. Via the other bolt head 18, a second furniture panel 4 can be secured to the first furniture panel 2. The bolt head 12 at the transition thereof to the bolt shaft 11 and the socket opening 21 have complementary cross sections so that the connecting bolt 10 is received in a gap-free manner in the socket opening 21.

FIG. 5a shows the mounted connecting fitting 1 having a socket 20 which is so narrow that the bolt projection 13 projects from the socket opening 24 in an outward direction and penetrates with the claw-like or blade-like end into the wall of the hole 3. This increases the extraction values of the connecting bolt 10. FIG. 5a shows the mounted connecting fitting 1 with a socket 20 which is so wide that the bolt projection 13 does not project outwardly out of the socket opening 24.

What is claimed is:

1. A connecting fitting comprising:
   a connecting bolt having a bolt shaft and a bolt head which has a radially outwardly protruding bolt projection and a latching projection between the bolt shaft and bolt projection at a side opposite the bolt projection, wherein a rear side of the bolt projection facing the bolt shaft is constructed as an inclined face which is inclined in relation to a longitudinal axis of the bolt shaft; and
   a sleeve which has a frontal sleeve opening and inside the sleeve both an inclined sleeve transverse face which is directed in a direction away from the sleeve opening and a latching recess which is arranged between the sleeve opening and sleeve transverse face at the side opposite the inclined sleeve transverse face, wherein the sleeve transverse face forms a wall of a jacket-sided open, lateral sleeve opening;
   wherein in the assembled state of the connecting fitting the bolt head is introduced into the sleeve opening and both the bolt projection engages with the inclined face thereof behind the inclined sleeve transverse face in the introduction direction of the connecting bolt and the latching projection is engaged in the latching recess.

2. The connecting fitting as claimed in claim 1, wherein the sleeve opening and the bolt head have complementary cross sections at the transition to the bolt shaft.

3. The connecting fitting as claimed in claim 1, wherein in the assembled state of the connecting fitting the bolt projection protrudes radially outward over the sleeve.

4. The connecting fitting as claimed in claim 1, wherein at the side of the bolt projection the bolt shaft merges via a radially outwardly directed step into the bolt head and in the assembled state of the connecting fitting the step terminates flush with the sleeve end face.

5. The connecting fitting as claimed in claim 1, wherein the sleeve has an opening which adjoins the sleeve transverse face outwardly in a radial direction.

6. The connecting fitting as claimed in claim 1, wherein the latching projection is constructed in a convex manner.

7. The connecting fitting as claimed in claim 1, wherein the bolt side opposite the bolt projection is slanted.

8. The connecting fitting as claimed in claim 1, wherein at the side of the bolt projection the bolt shaft merges via a radially outwardly directed step into the bolt head.

9. A furniture arrangement comprising two furniture panels and a connecting fitting as claimed in claim 1, wherein the sleeve is supported in a hole of one furniture panel and the connecting bolt is supported on the other furniture panel.

10. The furniture arrangement as claimed in claim 9, wherein the bolt projection engages through the sleeve opening into the wall of the hole.

\* \* \* \* \*